Sept. 29, 1970  F. J. GREIPEL  3,531,264
SAFETY LEAK DETECTOR
Filed Oct. 3, 1967
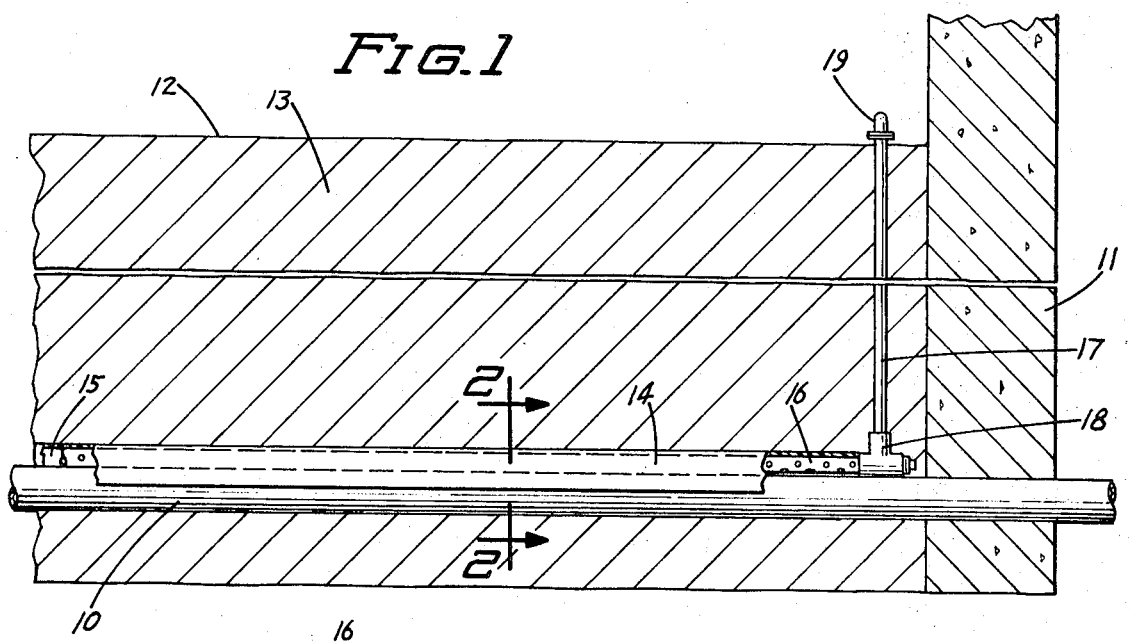
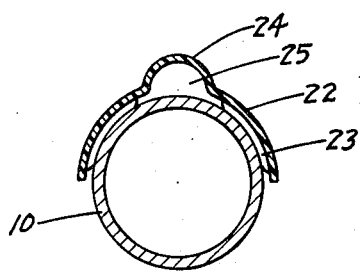
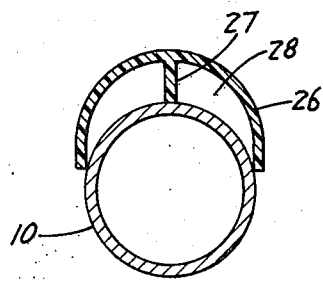
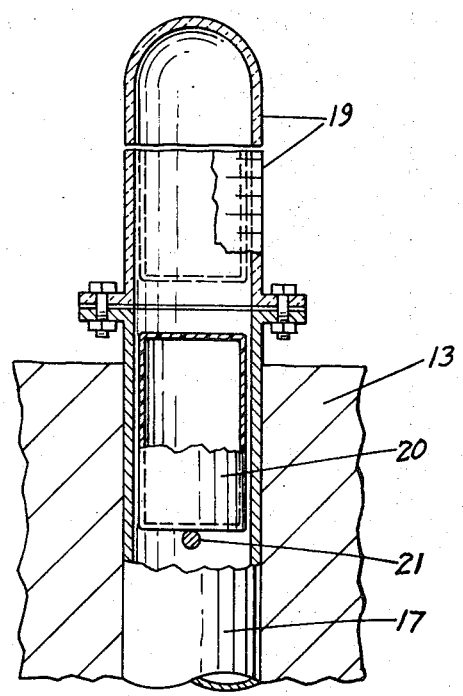
INVENTOR.
FRANK J. GREIPEL
BY Burd, MacEachron, Braddock, Bartz & Schwartz
ATTORNEYS 3,531,264
SAFETY LEAK DETECTOR
Frank J. Greipel, 49 Larpenteur Ave. E.,
St. Paul, Minn. 55109
Filed Oct. 3, 1967, Ser. No. 672,576
Int. Cl. G01m 3/04
U.S. Cl. 48—193       7 Claims

ABSTRACT OF THE DISCLOSURE

A system for detecting and locating leaks in buried fluid pipelines including an elongated hood partially enclosing the pipeline and extending along its length spaced from the top of the pipe to provide an open channel, and at least one vertical tubular riser intersecting that open channel. The open channel provides a path of least resistance for escaping fluid. The top of each riser includes a floatable visual signalling device which is normally out of sight but comes into view when lifted under pressure of escaping fluid. The appearance of the signalling device locates the leak as in the segment of pipeline monitored by it. Where the system includes a plurality of spaced apart risers the appearance of the signalling device in both of a pair of risers locates the leak as between them.

---

This invention relates to a system for detecting and locating leaks in buried pipeline installations of the type commonly employed for conveying fluids from a larger supply main to a residence or other building. The fluids most commonly conveyed in such pipelines are water and fuel gas, either natural or manufactured, although other fluids may obviously be conveyed through such lines.

The pipelines supplying individual customers from a supply main are usually smaller and made of lighter material and therefore somewhat more susceptible to leakage due to corrosion, breakage or wear. Leakage in fuel gas pipes is particularly difficult to detect and locate. Leakage may often occur undetected over long periods of time sufficient to permit accumulation of dangerous and potentially explosive quantities of gas.

It is the principal object of the present invention to provide a system for detecting and locating pipeline leaks which is of relatively simple and inexpensive construction, simple and easy to install along with installation of the pipeline, and maintenance-free.

The invention is illustrated in the accompanying drawings in which:

FIG. 1 is an elevation in section showing a portion of a fluid pipeline extending from a supply main to a building and fitted with the detector system of the present invention;

FIG. 2 is an enlarged transverse cross section on the line 2—2 of FIG. 1 and in the direction of the arrows;

FIG. 3 is an enlarged fragmentary cross section through the visible signal portion of the system;

FIG. 4 is a transverse section showing an alternative form of construction of a portion of the detection system; and FIG. 5 is a transverse section showing a still further alternative form of construction.

Referring to the drawings, in FIG. 1 there is shown a pipe 10 for conveying gas or water or other fluid from a supply main (not shown) to a building having a foundation wall 11. Pipe 10 is located at a substantial depth below ground level 12 being buried under a mass of overlying soil 13. This soil 13 may vary all the way from dense compact clay which is virtually impermeable to flow of fluids, to sand which is quite permeable. Such pipelines are commonly buried at depths ranging from about four to eight feet, depending in part upon the climate. In northern climes, the pipe is buried below the maximum expected frost line.

Pipe 10 is normally sealed into foundation wall 11. While some leaking fluid may enter the building around the pipe, because of the sealing material normally in place, this usually does not occur until a considerable amount of the leaking material has accumulated and built up pressure in the surrounding soil. According to the form of invention illustrated in FIGS. 1 and 2, a cover or hood 14 is disposed over the top of pipe 10. Hood 14 is elongated, generally semicircular in cross section, and partially encloses the pipe. It extends along the length of the pipe spaced from the top of the pipe to provide an open channel 15. The edges of hood 14 embrace the sides of pipe 10 loosely enough that any leakage from the bottom half of the pipe may find its way into open channel 15. The inside wall of hood 14 may be provided with ribs or grooves to insure against a tight fit between the bottommost edges of the hood and the side of the pipe.

In order to insure that the weight of the overlying soil 13 does not compress the hood 14 into close contact with the top of pipe 10, some rigid or semirigid spacing means is provided. As shown in FIGS. 1 and 2, this may be in the form of a rigid or semirigid apertured tube 16 extending along open channel 15 between the top of pipe 10 and the crown of hood 14. The purpose of the open channel 15 is to provide a path of least resistance for any leaking fluid. Leaking gas or water thus passes more easily through open channel 15, including apertured tube 16, then through even a porous material such as sand or other soil which may overlie the pipeline.

A vertical tubular riser 17 is in direct fluid communication with the open channel under hood 14. As seen in FIG. 1, tubular riser 17 is connected through a fitting 18 with apertured tube 16 which forms part of the open channel 15. Riser 17 extends to a point near or above the ground level 12. It is located adjacent the foundation wall 11, desirably adjacent the meter, whether inside or out, where it will be checked routinely as the meter is read. The top end of riser 17 is fitted with a cap 19 of substantially uniform inside diameter (FIG. 3) which is at least partially transparent.

A visible signalling element 20 is disposed in the upper end of riser 17, held as by means of a pin 21, spaced from the transparent portion of cap 19 by a distance at least equal to the length of the element 20 so that it is normally out of view through the transparent portion of cap 19. The signalling member 20 is desirably in the form of a lightweight floatable cylinder loosely fitting within riser 17 to be slidable therein. The signalling member should desirably be of some attention-attracting color, such as red or fluorescent orange or the like, so that when it appears within the transparent portion of cap 19 it is readily apparent. Whether solid or hollow, it should be of low density such that a minimum amount of pressure created in riser 17 due to escaping fluid will force the signal upwardly into cap 19 where it is visible.

Cap 19 is desirably of about the same diameter as riser 17 so that the signalling element 20 may also slide easily within it. Cap 19 may be in the form of an elongated glass tube closed at one end and provided with graduations such that a quantitative estimate of the magnitude of the leak may be made on the basis of the location of the signal 20 within the graduated tube.

Any escaping fluid, be it gas or liquid, from pipe 10 tends to follow the path of least resistance into and through the open channel 15 and thence into and up through riser 17 until it dislodges signal 20 from its rest 21 and forces it into view in cap 19. The fluid rises in the riser 17, which is of relatively small diameter, as a result of pressure buildup within the open channel. Even though the surrounding soil may be relatively porous and permeable, the unobstructed flow path of the open channel provides even less resistance.

The opposite ends of channel 15 are closed, either as the result of a positive closure member or the surrounding covering soil, or both. The length of pipeline to be monitored by a particular segment of the system should be relatively short to avoid the possibility of a large volume of escaping fluid accumulating in the open channel before sufficient pressure has built up to activate the visual signal. Typically, a gas or water line extending from a street main will be less than 100 feet in length. Where it is desired to monitor long lengths of pipeline, the system may be composed of a plurality of segments arrayed end for end and each provided with its own riser and signalling unit. Because pipelines tend to be buried for long periods of time during which property changes hands, records become lost and memories grow dim, it is desirable in some instances to install a riser and signal device at each end of the hood monitoring a segment of pipeline as a reminder of where those ends are, and to permit periodic testing of the system.

In FIG. 4, there is shown an alternative form of hood construction. This alternative hood 22 is shaped so as to have a diameter just slightly larger than that of pipe 10. It fits the top surface of the pipe closely but is spaced slightly therefrom by means of a plurality of spaced transverse ribs 23. A projecting crown 24 of semicircular cross section, but smaller diameter, defines an open channel 25 extending along the top of pipe 10. Channel 25 is then intersected by a tubular riser in direct fluid communication, as already described.

In FIG. 5, there is shown a further form of hood construction. Hood 26 is of semicircular cross section of diameter approximating that of pipe 10. The inner surface of hood 26 is provided with an inwardly extending central rib 27 extending longitudinally which serves to hold the crown of the hood spaced from the top of pipe 10 so as to define an open channel 28 on either side of the rib between the hood and the top of pipe 10. Channel 28 is similarly intersected by a riser 17 in direct fluid communication with the channel, as already described.

The elongated hoods comprising part of the leak detecting system according to the present invention must be formed from a material which is compatible with the fluid being conveyed through the pipeline being guarded. That is, the hood must not be subject to attack by the pipeline fluid in the event of leakage. It should be also resistant against natural corrosion and erosion over long periods of time. Various synthetic resinous materials are admirably suited for this purpose. Among these are ABS resins, acrylics, polyamides, polystyrenes, polyethylenes, polypropylenes and polyvinyl resins, all of which can be formed by extrusion, are readily worked, durable, etc. Similarly, the signalling element 20 must be formed from a material which is compatible with that being conveyed through the pipeline being monitored.

It is apparent that many modifications and variations of this invention as hereinbefore set forth may be made without departing from the spirit and scope thereof. The specific embodiments described are given by way of example only and the invention is limited only by the terms of the appended claims.

I claim:
1. A system for detecting leaks in buried fluid pipelines which comprises
 (A) an elongated hood overlying and partially enclosing a segment of pipeline being monitored,
 (B) said hood extending along the length of the pipeline and spaced from the top thereof to provide an open channel,
 (C) at least one vertical tubular riser intersecting said channel,
 (D) said tubular riser being of smaller diameter than said pipeline and hood and in direct fluid communication with said channel,
 (E) the top end of said riser being closed, visible, of substantially uniform inside diameter, and at least partially transparent,
 (F) a lightweight floatable signalling device loosely fitting and movable within said riser adjacent the top end, and
 (G) means for supporting said signalling device spaced from the top end of the riser.

2. A leak detecting system according to claim 1 further characterized in that said hood comprises an inverted semicylindrical flexible synthetic resinous trough-like member having central support means to hold the hood spaced from the pipeline.

3. A leak detecting system according to claim 2 further characterized in that said support means comprises an elongated perforated tube.

4. A leak detecting system according to claim 2 further characterized in that said support means comprises an integral central rib molded into said hood.

5. A leak detecting system according to claim 1 further characterized in that
 (A) the top end of said riser includes a tubular transparent glass segment,
 (B) said signalling device comprises a lightweight cylindrical plug of diameter less than the diameter of the riser, and
 (C) said means for supporting the signalling device is spaced from said glass segment by a distance at least equal to the length of said plug.

6. A leak detecting system according to claim 5 further characterized in that said glass segment is graduated.

7. A leak detecting system according to claim 1 further characterized in that at least a pair of risers spaced apart along the length of the pipeline intersect a common open channel.

References Cited

UNITED STATES PATENTS

| 330,267 | 11/1885 | Smith | 48—193 |
| 342,143 | 5/1886 | Smith et al. | 48—193 |
| 478,424 | 7/1892 | Gueguen | 48—193 |
| 2,403,897 | 7/1946 | Aller | 73—40 |
| 3,360,981 | 1/1968 | Badger | 73—40 |

JOSEPH SCOVRONEK, Primary Examiner

U.S. Cl. X.R.

73—40.5; 116—114; 137—312, 551